US006098135A

United States Patent [19]

Fukui

[11] Patent Number: 6,098,135

[45] Date of Patent: Aug. 1, 2000

[54] BUS ARBITRATION INTERFACE FOR TRANSFERRING SIGNALS CONVERTED IN SERIAL

[75] Inventor: Yoshinobu Fukui, Hyogo, Japan

[73] Assignee: NEC Corporation, Tokyo, Japan

[21] Appl. No.: 09/129,870

[22] Filed: Aug. 6, 1998

[30] Foreign Application Priority Data

Aug. 6, 1997 [JP] Japan .................................... 9-212062

[51] Int. Cl.[7] ...................................................... G06F 13/36

[52] U.S. Cl. ................................ 710/113; 710/22; 710/71

[58] Field of Search .................................... 710/110, 113, 710/126, 129, 105, 22, 71; 341/100, 101

[56] References Cited

U.S. PATENT DOCUMENTS

| | | | |
|---|---|---|---|
| 5,475,854 | 12/1995 | Thomsen et al. | 710/22 |
| 5,634,069 | 5/1997 | Hicok et al. | 710/22 |
| 5,774,744 | 6/1998 | Story et al. | 710/22 |
| 5,937,206 | 8/1999 | Nakamura | 710/22 |

FOREIGN PATENT DOCUMENTS

| | | |
|---|---|---|
| 63-128460 | 6/1988 | Japan . |
| 1-199255 | 8/1989 | Japan . |
| 1-179645 | 12/1989 | Japan . |
| 3-38934 | 2/1991 | Japan . |
| 3-113445 | 11/1991 | Japan . |
| 5-53981 | 3/1993 | Japan . |
| 8-101808 | 4/1996 | Japan . |

*Primary Examiner*—Glenn A. Auve
*Assistant Examiner*—X. Chung-Trans
*Attorney, Agent, or Firm*—Foley & Lardner

[57] ABSTRACT

A bus arbitration interface comprises first and second serial/parallel converting units connecting a DMA device to an LSI with a DMA controller built therein for exchanging a request signal sent from the DMA device to the DMA controller and an acknowledge signal sent from the DMA controller to the DMA device as serial signals, a DMA arbitration bus interface, that is an outside interface of the LSI, provided with signal I/O pins; and a DMA device arbitration interface that is an outside interface of the DMA device.

10 Claims, 4 Drawing Sheets

11
LSI
12
DMA CONTROLLER
CREQ0
CREQ1
CREQ2
CREQ3
CACK0
CACK1
CACK2
CACK3
13
SERIAL / PARALLEL CONVERTING UNIT
CLOCK DIVIDING UNIT
14
15
DMA ARBITRATION BUS INTERFACE
SREQ
SACK
DMACLK
CLK
16
SERIAL / PARALLEL CONVERTING UNIT
17
DREQ0
DREQ1
DREQ2
DREQ3
DACK0
DACK1
DACK2
DACK3
DMA DEVICE ARBITRATION INTERFACE
18
DMA DEVICE

21
LSI
22
BUS ARBITER
CREQ0
CREQ1
CREQ2
CREQ3
CACK0
CACK1
CACK2
CACK3
23
SERIAL / PARALLEL CONVERTING UNIT
CLOCK DIVIDING UNIT
24
25
BUS MASTER ARBITRATION BUS INTERFACE
SREQ
SACK
BUSCLK
CLK
26
SERIAL / PARALLEL CONVERTING UNIT
27
DREQ0
DREQ1
DREQ2
DREQ3
BACK0
BACK1
BACK2
BACK3
BUS MASTER DEVICE ARBITRATION INTERFACE
28
BUS MASTER DEVICE

41
LSI
42
DMA
CONTROLLER
45
CREQ0
CREQ1
CREQ2
CREQ3
CACK0
CACK1
CACK2
CACK3
DMA DEVICE
ARBITRATION
INTERFACE
DMACLK
47
DREQ0
DREQ1
DREQ2
DREQ3
BACK0
BACK1
BACK2
BACK3
DMA DEVICE
ARBITRATION
INTERFACE
48
DMA
DEVICE

BUS ARBITRATION INTERFACE FOR TRANSFERRING SIGNALS CONVERTED IN SERIAL

BACKGROUNDS OF THE INVENTION

1. Field of the Invention

The present invention relates to a bus arbitration interface, and more particularly to a bus arbitration interface in an LSI having a DMA (Direct Memory Access) controller therein or an LSI having a bus master arbitration function.

2. Description of the Related Art

The structure of this kind of the conventional bus arbitration interface is shown in FIG. 4. FIG. 4 shows an example of a bus arbitration interface in an LSI with a DMA controller built therein.

With reference to FIG. 4, an LSI 41 has a DMA controller 42 and a DMA device arbitration interface 45. There is a DMA device 48 for gaining access to the LSI 41 through a DMA device arbitration interface 47, outside of the LSI 41. Assume that the DMA device 48 consists of four devices, although they are not illustrated. Signals to be exchanged between the LSI 41 and the DMA device 48 include a DMA request signal to be transferred from each device to the DMA controller 42, a DMA acknowledge signal to be transferred from the DMA controller 42 to each device, and an operation clock signal of the DMA controller 42.

The LSI 41 permits each DMA device to transfer data by the two signals; the DMA request signal and the DMA acknowledge signal. Therefore, the number (n) of devices in the DMA device 48 requires (n×2) signals. One operation clock signal of the DMA controller 42 is further added to them and therefore (n×2+1) DMA interface signals are totally required for the LSI 41's access to the DMA device 48. As mentioned above, since FIG. 4 shows an example in the case where the number of devices included in the DMA device 48 is four, the DMA interface signal results in 9 (=4×2+1). Therefore, the LSI 41 requires nine I/O pins.

As mentioned above, in the conventional bus arbitration interface, an LSI requires the number of I/O pins in proportion to the number of the DMA devices to be accessed by the LSI. Therefore, the number of I/O pins is increased with a recent inclination to a multifunctional and large-scaled LSI, thereby causing complexity of the LSI structure and high cost.

SUMMARY OF THE INVENTION

An object of the present invention is to provide a bus arbitration interface capable of simplifying the structure of an LSI and reducing the cost, by decreasing the number of I/O pins of the LSI, in the LSI with a DMA controller built therein or in the LSI having a bus master arbitration function.

According to one aspect of the invention, a bus arbitration interface for connecting an LSI and a given device, comprises

- a serial signal transferring means, connecting a DMA device to an LSI with a DMA controller built therein, for exchanging a request signal sent from the DMA device to the DMA controller and an acknowledge signal sent from the DMA controller to the DMA device as serial signals,
- a DMA arbitration bus interface means, that is an outside interface of the LSI, provided with signal I/O pins, and
- a DMA device arbitration interface means that is an outside interface of the DMA device.

In the preferred construction, the serial signal transferring means comprises a first serial/parallel converting means, mounted within the LSI, for converting the acknowledge signal supplied from the DMA controller into a serial signal so to supply the serial signal to the DMA device through the DMA arbitration bus interface means, as well as converting the request signal of the serial signal received through the DMA arbitration bus interface means into a parallel signal for every DMA device so to pass the parallel signal to the DMA controller, a clock dividing means, mounted within the LSI, for generating an operation clock for the DMA controller, and a second serial/parallel converting means, provided on the side of the DMA device, for converting the request signal received from the DMA device through the DMA device arbitration interface means into a serial signal so to send the serial signal to the LSI, as well as converting the acknowledge signal of the serial signal received from the LSI into a parallel signal for every DMA device so to pass the parallel signal to the DMA device through the DMA device arbitration interface means.

In the preferred construction, the serial signal transferring means comprises a first serial/parallel converting means, mounted within the LSI, for converting the acknowledge signal supplied from the DMA controller into a serial signal so to supply the serial signal to the DMA device through the DMA arbitration bus interface means, as well as converting the request signal of the serial signal received through the DMA arbitration bus interface means into a parallel signal for every DMA device so to pass the parallel signal to the DMA controller, a clock dividing means, mounted within the LSI, for generating an operation clock for the DMA controller by dividing an operation clock for a DMA bus which interconnects the DMA device and the LSI into the same number as that of the DMA devices controlled by the DMA controller, and a second serial/parallel converting means, provided on the side of the DMA device, for converting the request signal received from the DMA device through the DMA device arbitration interface means into a serial signal so to send the serial signal to the LSI, as well as converting the acknowledge signal of the serial signal received from the LSI into a parallel signal for every DMA device so to pass the parallel signal to the DMA device through the DMA device arbitration interface means.

In another preferred construction, the serial signal transferring means comprises a first serial/parallel converting means, mounted within the LSI, for converting the acknowledge signal supplied from the DMA controller into a serial signal so to supply the serial signal to the DMA device through the DMA arbitration bus interface means, as well as converting the request signal of the serial signal received through the DMA arbitration bus interface means into a parallel signal for every DMA device so to pass the parallel signal to the DMA controller, a clock dividing means, mounted within the LSI, for generating an operation clock for the DMA controller, and a second serial/parallel converting means, provided on the side of the DMA device, for converting the request signal received from the DMA device through the DMA device arbitration interface means into a serial signal so to send the serial signal to the LSI, as well as converting the acknowledge signal of the serial signal received from the LSI into a parallel signal for every DMA device so to pass the parallel signal to the DMA device through the DMA device arbitration interface means,

- wherein the serial signal transferring means sampling in parallel-to-serial signal conversion being performed at the rising edge of the operation clock and sampling in serial-to-parallel signal restoration being performed at the falling edge of the operation clock, in the first and second serial/parallel converting means.

In another preferred construction, the serial signal transferring means comprises a first serial/parallel converting means, mounted within the LSI, for converting the acknowledge signal supplied from the DMA controller into a serial signal so to supply the serial signal to the DMA device through the DMA arbitration bus interface means, as well as converting the request signal of the serial signal received through the DMA arbitration bus interface means into a parallel signal for every DMA device so to pass the parallel signal to the DMA controller, a clock dividing means, mounted within the LSI, for generating an operation clock for the DMA controller by dividing an operation clock for a DMA bus which interconnects the DMA device and the LSI into the same number as that of the DMA devices controlled by the DMA controller, and a second serial/parallel converting means, provided on the side of the DMA device, for converting the request signal received from the DMA device through the DMA device arbitration interface means into a serial signal so to send the serial signal to the LSI, as well as converting the acknowledge signal of the serial signal received from the LSI into a parallel signal for every DMA device so to pass the parallel signal to the DMA device through the DMA device arbitration interface means, wherein serial signal transferring means sampling in parallel-to-serial signal conversion being performed at the rising edge of the operation clock for the DMA device and sampling in serial-to-parallel signal restoration being performed at the falling edge of the operation clock for the DMA device, in the first and second serial/parallel converting means.

According to another aspect of the invention, a bus arbitration interface for connecting an LSI to a given device, comprises a serial signal transferring means, connecting a bus master device to an LSI having a bus master arbitration function, for exchanging a request signal sent from the bus master device to a bus arbiter built in the LSI and an acknowledge signal sent from the bus arbiter to the bus master device as serial signals, a bus master arbitration bus interface means, that is an outside interface of the LSI, provided with signal I/O pins, and a bus master device arbitration interface means that is an outside interface of the bus master device.

In the preferred construction, the serial signal transferring means comprises a first serial/parallel converting means, mounted within the LSI, for converting the acknowledge signal supplied from the bus arbiter into a serial signal so to supply the serial signal to the bus master device through the bus master arbitration bus interface means, as well as converting the request signal of the serial signal received through the bus master arbitration bus interface means into a parallel signal for every bus master device so to pass the parallel signal to the bus arbiter, a clock dividing means, mounted within the LSI, for generating an operation clock for the bus arbiter, and a second serial/parallel converting means, provided on the side of the bus master device, for converting the request signal received from the bus master device through the bus master device arbitration interface means into a serial signal so to send the serial signal to the LSI, as well as converting the acknowledge signal of the serial signal received from the LSI into a parallel signal for every bus master device so to pass the parallel signal to the bus master device through the bus master device arbitration interface means.

In the preferred construction, the serial signal transferring means comprises a first serial/parallel converting means, mounted within the LSI, for converting the acknowledge signal supplied from the bus arbiter into a serial signal so to supply the serial signal to the bus master device through the bus master arbitration bus interface means, as well as converting the request signal of the serial signal received through the bus master arbitration bus interface means into a parallel signal for every bus master device so to pass the parallel signal to the bus arbiter, a clock dividing means, mounted within the LSI, for generating an operation clock for the bus arbiter by dividing an operation clock for a bus which interconnects the bus master device and the LSI into the same number as that of the bus master devices controlled by the bus arbiter, and a second serial/parallel converting means, provided on the side of the bus master device, for converting the request signal received from the bus master device through the bus master device arbitration interface means into a serial signal so to send the serial signal to the LSI, as well as converting the acknowledge signal of the serial signal received from the LSI into a parallel signal for every bus master device so to pass the parallel signal to the bus master device through the bus master device arbitration interface means.

In the preferred construction, the serial signal transferring means comprises a first serial/parallel converting means, mounted within the LSI, for converting the acknowledge signal supplied from the bus arbiter into a serial signal so to supply the serial signal to the bus master device through the bus master arbitration bus interface means, as well as converting the request signal of the serial signal received through the bus master arbitration bus interface means into a parallel signal for every bus master device so to pass the parallel signal to the bus arbiter, a clock dividing means, mounted within the LSI, for generating an operation clock for the bus arbiter, and a second serial/parallel converting means, provided on the side of the bus master device, for converting the request signal received from the bus master device through the bus master device arbitration interface means into a serial signal so to send the serial signal to the LSI, as well as converting the acknowledge signal of the serial signal received from the LSI into a parallel signal for every bus master device so to pass the parallel signal to the bus master device through the bus master device arbitration interface means, wherein serial signal transferring means sampling in parallel-to-serial signal conversion being performed at the rising edge of the operation clock and sampling in serial-to-parallel signal restoration being performed at the falling edge of the operation clock, in the first and second serial/parallel converting means.

In another preferred construction, the serial signal transferring means comprises a first serial/parallel converting means, mounted within the LSI, for converting the acknowledge signal supplied from the bus arbiter into a serial signal so to supply the serial signal to the bus master device through the bus master arbitration bus interface means, as well as converting the request signal of the serial signal received through the bus master arbitration bus interface means into a parallel signal for every bus master device so to pass the parallel signal to the bus arbiter, a clock dividing means, mounted within the LSI, for generating an operation clock for the bus arbiter by dividing an operation clock for a bus master bus interconnecting the bus master device and the LSI into the same number as that of the bus master devices controlled by the bus arbiter, and a second serial/parallel converting means, provided on the side of the bus master device, for converting the request signal received from the bus master device through the bus master device arbitration interface means into a serial signal so to send the serial signal to the LSI, as well as converting the acknowledge signal of the serial signal received from the LSI into a parallel signal for every bus master device so to pass the parallel signal to the bus master device through the bus master device arbitration interface means, wherein serial signal transferring means sampling in parallel-to-serial signal conversion being performed at the rising edge of the operation clock for the bus master device and sampling in serial-to-parallel signal restoration being performed at the falling edge of the operation clock for the bus master device, in the first and second serial/parallel converting means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
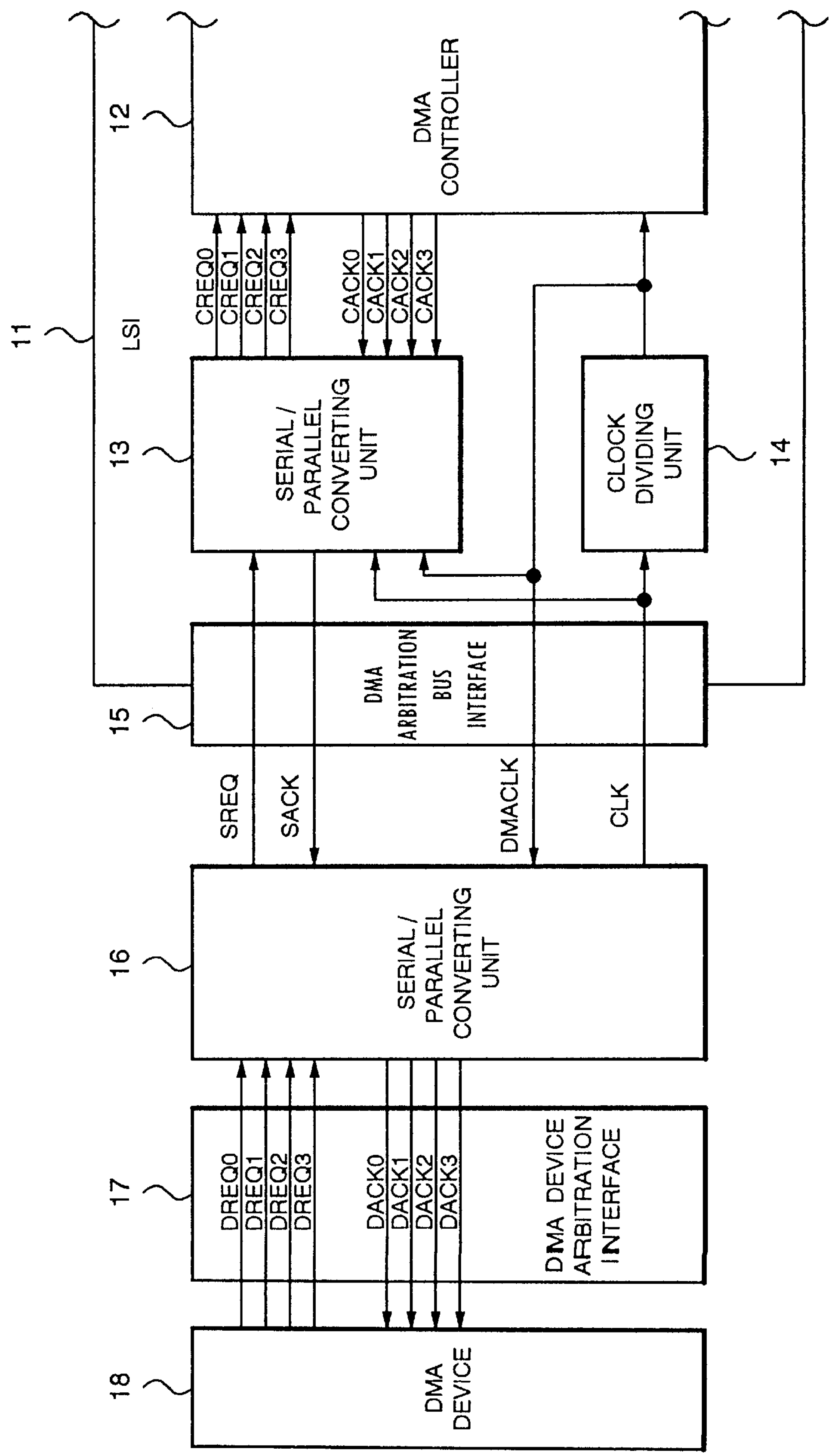
FIG. 1 is a block diagram showing the structure of a bus arbitration interface according to an embodiment of the present invention.

FIG. 1 is a block diagram showing the structure of a bus arbitration interface according to an embodiment of the present invention. Hereinafter, the bus arbitration interface in an LSI with a DMA controller built therein will be described with reference to FIG. 1.

With reference to FIG. 1, the bus arbitration interface of the embodiment comprises a serial/parallel converting unit 13, a clock dividing unit 14, and a DMA arbitration bus interface 15 which are mounted on an LSI 11, and a serial/parallel converting unit 16 and a DMA device arbitration interface 17 which are provided on the side of a DMA device 18. Provided with a DMA controller 12, the LSI 11 gains access to the DMA device 18 through the above bus arbitration interface. Signals to be exchanged between the DMA controller 12 and the DMA device 18 are converted by the serial/parallel converting units 13 and 16, and therefore serial signals are transferred between the LSI 11 and the serial/parallel converting unit 16. FIG. 1 shows only the characteristic components of the embodiment and the description of the other general components is omitted there. Assume that the DMA device 18 consists of four devices, although they are not illustrated.

In the above components, the DMA controller 12 of the LSI 11 has a DMA request signal (CREQx), a DMA acknowledge signal (CACKx), and an operation clock signal for the DMA controller 12 (DMACLK) as a signal for use in access to the DMA device 18.

Receiving the DMA request signal serialized by the serial/parallel converting unit 16 on the side of the DMA device 18 (SREQ) through the DMA arbitration bus interface 15, the serial/parallel converting unit 13 converts it into parallel, and passes it to the DMA controller 12 as the DMA request signal (CREQX) for the DMA controller 12. The unit 13 converts the DMA acknowledge signal (CACKX) supplied from the DMA controller 12 into serial, supplies it to the DMA device 18 through the DMA arbitration bus interface 15 as the DMA acknowledge signal (SACK).

The clock dividing unit 14 generates an operation clock signal (DMACLK) for the DMA controller 12 out of the DMA bus clock (CLK) that is an operation clock signal of a serial bus. The generated operation clock signal (DMACLK) is supplied to the DMA controller 12 as well as to the serial/parallel converting unit 13 and the serial/parallel converting unit 16. Since the number of devices in the DMA device 18 is defined as four in the embodiment, a clock signal (CLK) is divided by four, so to generate an operation clock signal (DMACLK). In other words, a clock signal (CLK) having a frequency four times as many as the operation clock signal (DMACLK) is to be entered.

The DMA arbitration bus interface 15 is an outside interface of the LSI 11 for transferring a serial DMA request signal (SREQ), a serial DMA acknowledge signal (SACK), a DMA bus clock (CLK), and an operation clock signal for DMA controller (DMACLK).

The serial/parallel converting unit 16 converts the DMA request signal (DREQX) supplied from the DMA device 18 into serial, so to send it to the LSI 11 as the DMA request signal (SREQ). Receiving the DMA acknowledge signal (SACK) serialized by the first serial/parallel converting unit 13 and supplied through the DMA arbitration bus interface 15, the unit 16 converts it into parallel and supplies it as the DMA acknowledge signal for the DMA device 18 (DACKx).

The DMA device arbitration interface 17 transfers a DMA request signal (DREQX) and a DMA acknowledge signal (DACKx).

Figure 2:
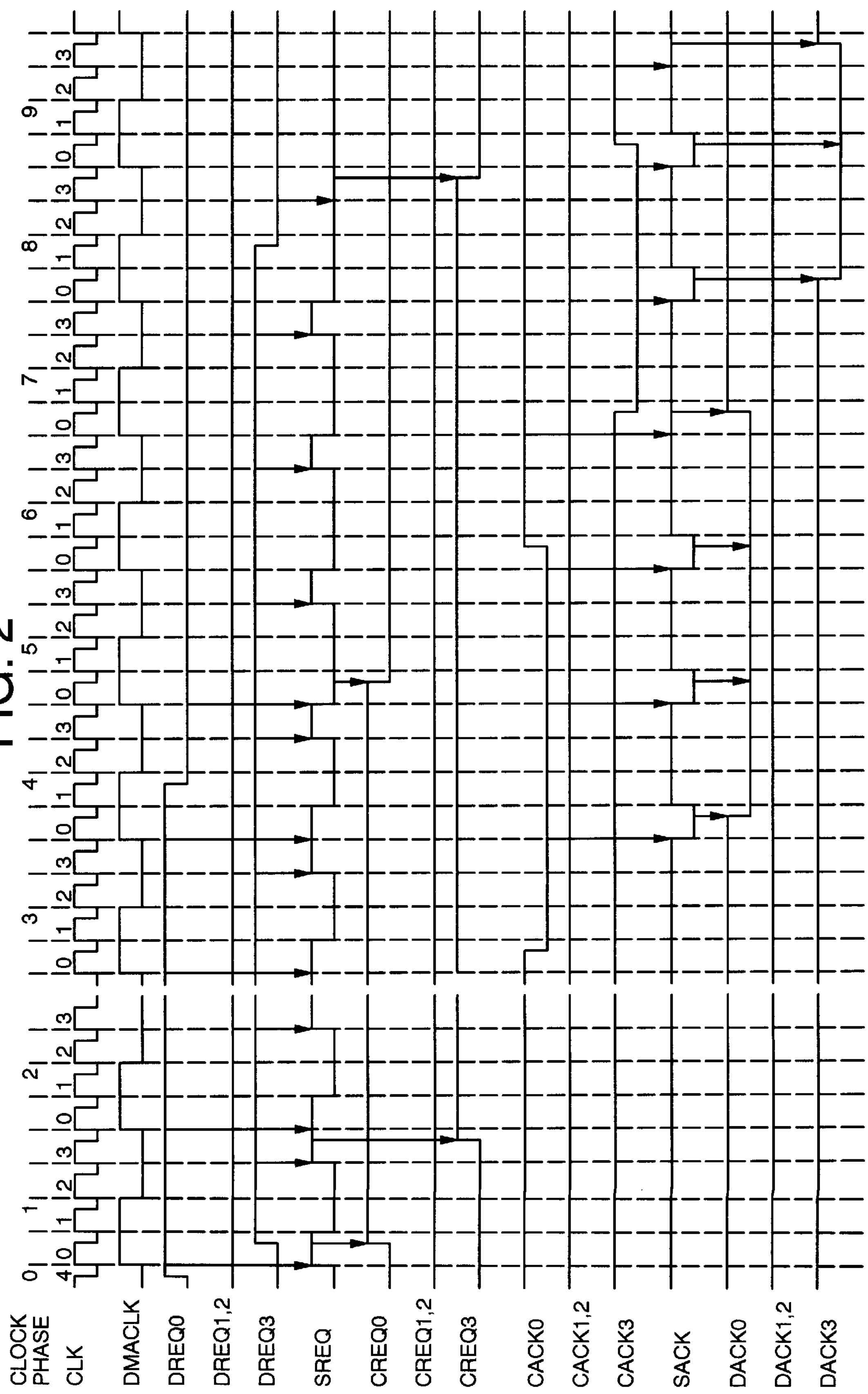
FIG. 2 is a timing chart showing the operation of the embodiment.

This time, referring to FIG. 2, the operation of the embodiment will be described, by way of example, in the case where two of the four DMA devices operate. The basic operation of the DMA arbitration bus will be described at first.

Because the number of devices in the DMA device is four, the clock dividing unit 14 divides a clock signal (CLK) by four, so to generate an operation clock signal (DMACLK). Since it is divided by four, four clocks of the operation clock signal (DMACLK) corresponds to one clock of the clock signal (CLK). Each device is separately assigned to every clock frequency of the clock signal (CLK). For example, four DMA devices are defined as a device (0), a device (1), a device (2), and a device (3), and four clocks of the operation clock signal (DMACLK) generated out of one clock of the clock signal (CLK) are respectively defined as the clock signals for device (0), device (1), device (2), and device (3) in the rising order, which are respectively defined as the data phase (0), (1), (2), and (3). The DMA request signals (DREQ0 to 3) of the respective devices and the DMA acknowledge signals (DACK0 to 3) can be supplied to the DMA bus only in the respective data phases as the serial DMA request signal (SREQ) and the serial DMA acknowledge signal (SACK) (refer to CLK, DMACLK, and phase in FIG. 2).

The serial/parallel converting units 13 and 17 sample signals of the respective devices (0) to (3) at the rising edges of the respective operation clock signals (CLK) of the respective phases, in the parallel-to-serial conversion. For example, if device (0), each unit samples DREQ0 and CACK0 at the rising edge of the clock signal (CLK) of the phase (0). The data signals (SREQ, SACK) are supplied to the DMA bus in synchronization with each rising edge of the clock signal (CLK).

While, the units 13 and 17 sample the data signals (SREQ, SACK) on the DMA bus at the falling edge of the clock signal (CLK) and restore them to the signals of the respective devices in synchronization with the falling edges of the operation clock signals (CLK) of the respective phases, in the serial-to-parallel conversion. For example, if device (0), they are restored to CREQ0 and DACK0 at the falling edge of the clock signal (CLK) of the phase (0).

Detailed operation of the embodiment will be described this time.

At the clock (0)—phase (4), DREQ0 that is an input from the device (0) becomes "1" at first. Since the serial/parallel converting unit 16 sampled DREQ0 as "1" at the rising edge of the clock signal (CLK) of the clock (1)—phase (0), the parallel-to-serial conversion is performed and SREQ becomes "1" during the clock (1) phase (0). Since the serial/parallel converting unit 13 samples SREQ as "1" at the falling edge of the clock signal (CLK) of the clock (1)—phase (0), the serial-to-parallel conversion is performed and CREQ0 becomes DREQ3, that is an input from the device (3), becomes "1" at the clock (1)—phase (0). Since the serial/parallel converting unit 16 sampled DREQ3 as "1" at the rising edge of the clock signal (CLK) of the clock (1)—phase (3), the parallel-to-serial conversion is performed and SREQ becomes "1" during the clock (1) phase (3). Since the serial/parallel converting unit 13 samples SREQ as "1" at the falling edge of the clock signal (CLK) of the clock (1)—phase (3), the serial-to-parallel conversion is performed and CREQ 3 becomes "1".

The similar conversion will be performed at the phases (1) and (2) with respect to DREQ1 and DREQ2. The same operation as clock (1) will be performed also at the clock (2) because DREQ0 to DREQ3 are not changed from the above clock (1).

This time, CACK0 that is an input from the DMA controller 12 becomes "0" at the clock (3)—phase (0). Since the serial/parallel converting unit 13 samples CACK0 as "0" at the rising edge of the clock signal (CLK) of the clock (4)—phase (0), the parallel-to-serial conversion is performed and SACK becomes "0" during the clock (4)—phase (0). Since the serial/parallel converting unit 16 samples SACK as "0" at the falling edge of the clock signal (CLK) of the clock (4)—phase (0), the serial-to-parallel conversion is performed and DACK0 becomes "0". DREQ0 becomes "0" at the clock (4)—phase (1).

Since the serial/parallel converting unit 16 sampled DREQ0 as "0" at the rising edge of the clock signal (CLK) of the clock (5)—phase (0), the parallel-to-serial conversion is performed and SREQ becomes "0" during the clock (5)—phase (0). Since the serial/parallel converting unit 13 samples SREQ as "0" at the falling edge of the clock signal (CLK) of the clock (5)—phase (0), the serial-to-parallel conversion is performed and CREQ0 becomes "0".

This time, CACK0 that is an input from the DMA controller 12 becomes "1" at the clock (6)—phase (0). Since the serial/parallel converting unit 13 samples CACK0 as "1" at the rising edge of the clock signal (CLK) of the clock (7)—phase (0), the parallel-to-serial conversion is performed and SACK becomes "1" during the clock (7)—phase (0). Since the serial/parallel converting unit 16 samples SACK as "1" at the falling edge of the clock signal (CLK) of the clock (7)—phase (0), the serial-to-parallel conversion is performed and DACK0 becomes "1".

This time, CACK3 that is an input from the DMA controller 12 becomes "0" at the clock (7)—phase (0). Since the serial/parallel converting unit 13 samples CACK3 as "0" at the rising edge of the clock signal (CLK) of the clock (7)—phase (3), the parallel-to-serial conversion is performed and SACK becomes "0" during the clock (7)—phase (3). Since the serial/parallel converting unit 16 samples SACK as "0" at the falling edge of the clock signal (CLK) of the clock (7)—phase (3), the serial-to-parallel conversion is performed and DACK3 becomes "0".

DREQ3 becomes "0" at the clock (8)—phase (1). Since the serial/parallel converting unit 16 samples DREQ3 as "0" at the rising edge of the clock signal (CLK) of the clock (8)—phase (3), the parallel-to-serial conversion is performed and SREQ becomes "0" during the clock (8)—phase (3). Since the serial/parallel converting unit 13 samples SREQ as "0" at the falling edge of the clock signal (CLK) of the clock (8)—phase (3), the serial-to-parallel conversion is performed and CREQ3 becomes "0".

This time, CACK3 becomes "1" at the clock (9)—phase (0). Since the serial/parallel converting unit 13 samples CACK3 as "1" at the rising edge of the clock signal (CLK) of the clock (9)—phase (3), the parallel-to-serial conversion is performed and SACK becomes "1" during the clock (9)—phase (3). Since the serial/parallel converting unit 16 samples SACK as "1" at the falling edge of the clock signal (CLK) of the clock (9)—phase (3), the serial-to-parallel conversion is performed and DACK3 becomes "1".

As mentioned above, in the embodiment, four I/O pins can cover an LSI with a DMA controller built therein by serializing an arbitration interface for the DMA device. That is to say, the embodiment can decrease the number of I/O pins extremely, which have been required so many in proportion to the number of the connected DMA devices in the conventional technique. Although the description of this embodiment has been made in the case where the number of DMA devices is four, it is needless to say that the number of DMA devices is not restricted to four.

Figure 3:
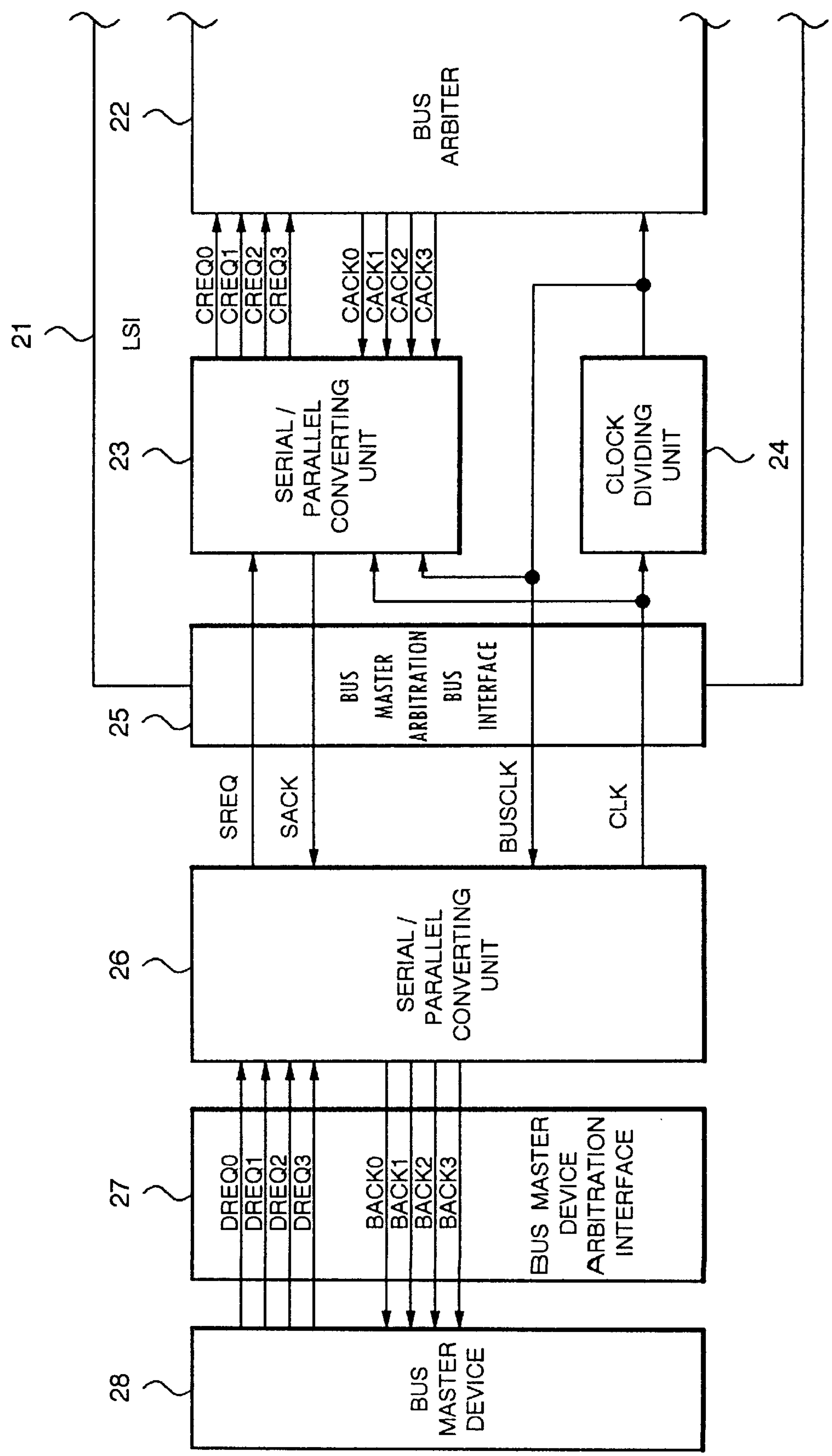
FIG. 3 is a block diagram showing the structure of a bus arbitration interface according to another embodiment of the present invention.
Figure 4:
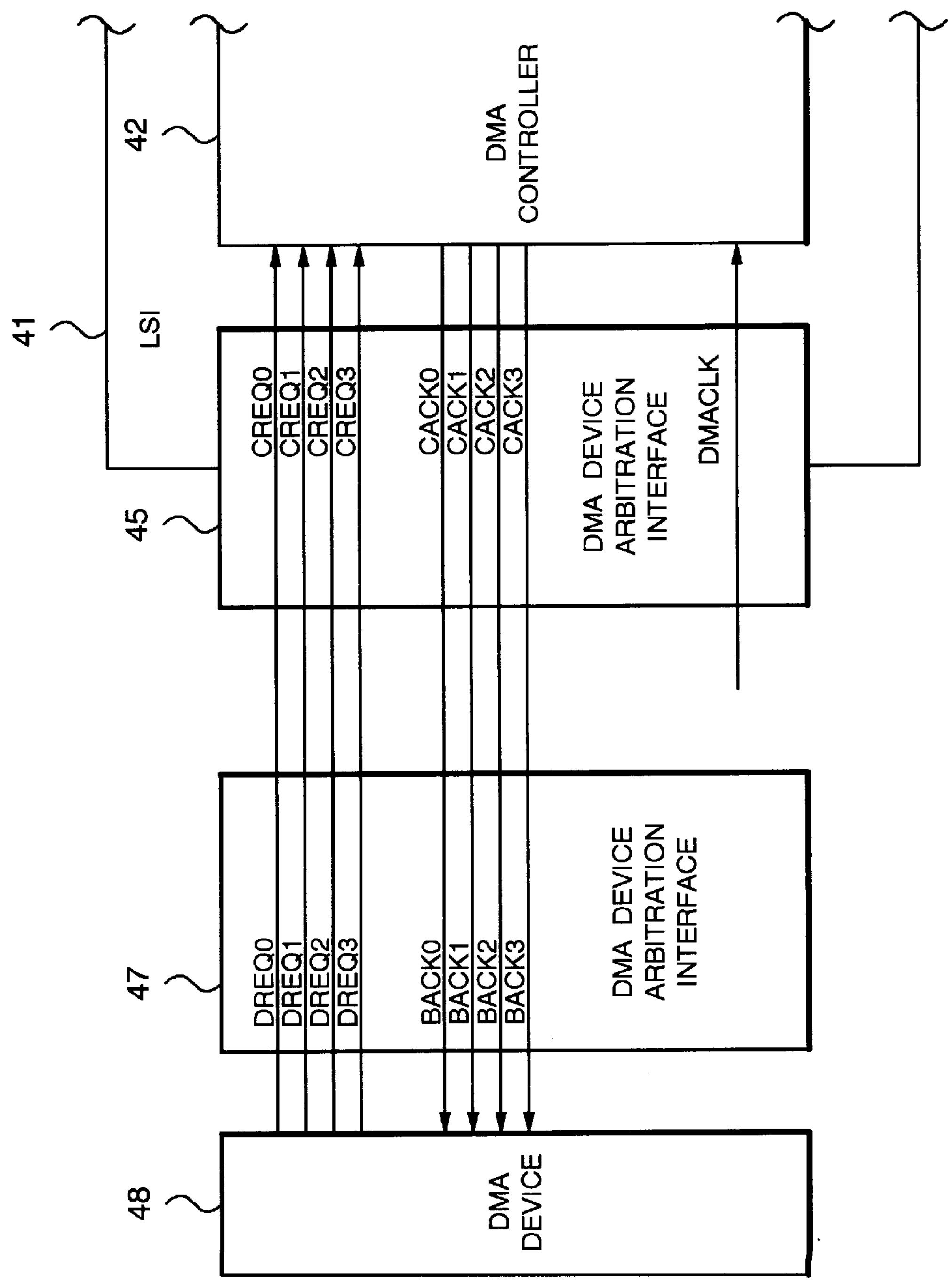
FIG. 4 is a block diagram showing the structure of the conventional bus arbitration interface.

FIG. 3 is a block diagram showing the structure of a bus arbitration interface according to another embodiment of the present invention. Hereinafter, the bus arbitration interface in an LSI having a bus mater arbitration function will be described with reference to FIG. 3. In this embodiment, a bus master device is connected to an LSI instead of a DMA device.

With reference to FIG. 3, the bus arbitration interface of the embodiment comprises a serial/parallel converting unit 23, a clock dividing unit 24, and a bus master arbitration bus interface 25 which are mounted on an LSI 21, and a serial/parallel converting unit 26 and a bus master device arbitration interface 27 which are provided on the side of a bus master device 28. Provided with a bus arbiter 22, the LSI 21 gains access to the bus master device 28 through the above bus arbitration interface. Signals to be exchanged between the bus arbiter 22 and the bus master device 28 are converted by the serial/parallel converting units 23 and 26, and namely serial signals are to be transferred between the LSI 21 and the serial/parallel converting unit 26. FIG. shows only the characteristic components of the embodiment and the description of the other general components is omitted there. Assume that the bus master device 28 consists of four devices, although they are not illustrated.

In the above components, the bus arbiter 22 of the LSI 21 has a bus request signal (BREQx), a bus acknowledge signal (BACKx), and an operation clock signal for the bus arbiter 22 (BUSCLK) as a signal for use in access to the bus master device 28. Namely, the clock dividing unit 24 generates an operation clock signal (BUSCLK) by dividing a bus master clock signal (CLK).

The bus master arbitration bus interface 25 is an outside interface of the LSI 21 for transferring a serial bus master request signal (SREQ), a serial bus master acknowledge signal (SACK), a bus master clock signal (CLK), and an operation clock signal for bus arbiter (BUSCLK).

The serial/parallel converting unit 23 and the serial/parallel converting unit 26 respectively have the same function as the serial/parallel converting unit 13 and the serial/parallel converting unit 16 in the first embodiment shown in FIG. 1.

The operation of the embodiment is similar to the operation of the first embodiment having been described with reference to FIG. 2. That is, sampling is performed at the rising edge of a clock signal (CLK) in conversion from a parallel signal to a serial signal and sampling is performed at the falling edge of a clock signal (CLK) in restoration from a serial signal to a parallel signal.

As mentioned above, this embodiment can extremely decrease the number of I/O pins of an LSI with a bus arbiter built therein, by serializing an arbitration interface for a bus master device.

As set forth hereinabove, the present invention can decrease the number of I/O pins of an LSI extremely, by use of a serial interface as an arbitration interface for a DMA device or a bus master device, which results in simplifying the structure of the LSI and reducing the cost.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A bus arbitration interface for connecting an LSI and a given device, comprising:

a serial signal transferring means, connecting a DMA device to an LSI with a DMA controller built therein, for exchanging a request signal sent from the DMA device to the DMA controller and an acknowledge signal sent from the DMA controller to the DMA device as serial signals;

a DMA arbitration bus interface means, that is an outside interface of the LSI, provided with signal I/O pins; and a DMA device arbitration interface means that is an outside interface of the DMA device; and wherein said serial signal transferring means comprising a first serial/parallel converting means, mounted within the LSI, for converting the acknowledge signal supplied from the DMA controller into a serial signal so to supply the serial signal to the DMA device through said DMA arbitration bus interface means, as well as converting the request signal of the serial signal received through said DMA arbitration bus interface means into a parallel signal for every DMA device so to pass the parallel signal to the DMA controller, a clock dividing means, mounted within the LSI, for generating an operation clock for the DMA controller, and a second serial/parallel converting means, provided on the side of the DMA device, for converting the request signal received from the DMA device through said DMA device arbitration interface means into a serial signal so to send the serial signal to the LSI, as well as converting the acknowledge signal of the serial signal received from the LSI into a parallel signal for every DMA device so to pass the parallel signal to the DMA device through said DMA device arbitration interface means, wherein said serial signal transferring means sampling in parallel-to-serial signal conversion being performed at the rising edge of the operation clock and sampling in serial-to-parallel signal restoration being performed at the falling edge of the operation clock, in said first and second serial/parallel converting means.

2. A bus arbitration interface for connecting an LSI and a given device, comprising:

a serial signal transferring means, connecting a DMA device to an LSI with a DMA controller built therein, for exchanging a request signal sent from the DMA device to the DMA controller and an acknowledge signal sent from the DMA controller to the DMA device as serial signals;

a DMA arbitration bus interface means, that is an outside interface of the LSI, provided with signal I/O pins; and a DMA device arbitration interface means that is an outside interface of the DMA device; and wherein said serial signal transferring means comprising a first serial/parallel converting means, mounted within the LSI, for converting the acknowledge signal supplied from the DMA controller into a serial signal so to supply the serial signal to the DMA device through said DMA arbitration bus interface means, as well as converting the request signal of the serial signal received through said DMA arbitration bus interface means into a parallel signal for every DMA device so to pass the parallel signal to the DMA controller, a clock dividing means, mounted within the LSI, for generating an operation clock for the DMA controller by dividing an operation clock for a DMA bus which interconnects the DMA device and the LSI into the same number as that of the DMA devices controlled by the DMA controller, and a second serial/parallel converting means, provided on the side of the DMA device, for converting the request signal received from the DMA device through said DMA device arbitration interface means into a serial signal so to send the serial signal to the LSI, as well as converting the acknowledge signal of the serial signal received from the LSI into a parallel signal for every DMA device so to pass the parallel signal to the DMA device through said DMA device arbitration interface means, wherein serial signal transferring means sampling in parallel-to-serial signal conversion being performed at the rising edge of the operation clock for the DMA device and sampling in serial-to-parallel signal restoration being performed at the falling edge of the operation clock for the DMA device, in said first and second serial/parallel converting means.

3. A bus arbitration interface for connecting an LSI to a given device, comprising:

a serial signal transferring means, connecting a bus master device to an LSI having a bus master arbitration function, for exchanging a request signal sent from the bus master device to a bus arbiter built in the LSI and an acknowledge signal sent from the bus arbiter to the bus master device as serial signals;

a bus master arbitration bus interface means, that is an outside interface of the LSI, provided with signal I/O pins; and a bus master device arbitration interface means that is an outside interface of the bus master device; and wherein said serial signal transferring means comprising a first serial/parallel converting means, mounted within the LSI, for converting the acknowledge signal supplied from the bus arbiter into a serial signal so to supply the serial signal to the bus master device through said bus master arbitration bus interface means, as well as converting the request signal of the serial signal received through said bus master arbitration bus interface means into a parallel signal for every bus master device so to pass the parallel signal to the bus arbiter, a clock dividing means, mounted within the LSI, for generating an operation clock for the bus arbiter, and a second serial/parallel converting means, provided on the side of the bus master device, for converting the request signal received from the bus master device through said bus master device arbitration interface means into a serial signal so to send the serial signal to the LSI, as well as converting the acknowledge signal of the serial signal received from the LSI into a parallel signal for every bus master device so to pass the parallel signal to the bus master device through said bus master device arbitration interface means, wherein serial signal transferring means sampling in parallel-to-serial signal conversion being performed at the rising edge of the operation clock and sampling in serial-to-parallel signal restoration being performed at the falling edge of the operation clock, in said first and second serial/parallel converting means.

4. A bus arbitration interface for connecting an LSI to a given device, comprising:

a serial signal transferring means, connecting a bus master device to an LSI having a bus master arbitration function, for exchanging a request signal sent from the bus master device to a bus arbiter built in the LSI and an acknowledge signal sent from the bus arbiter to the bus master device as serial signals;

a bus master arbitration bus interface means that is an outside interface of the LSI, provided with signal I/O pins; and a bus master device arbitration interface means that is an outside interface of the bus master device; and wherein said serial signal transferring means comprising a first serial/parallel converting means, mounted within the LSI, for converting the acknowledge signal supplied from the bus arbiter into a serial signal so to supply the serial signal to the bus master device through said bus master arbitration bus interface means, as well as converting the request signal of the serial signal received through said bus master arbitration bus interface means into a parallel signal for every bus master device so to pass the parallel signal to the bus arbiter, a clock dividing means, mounted within the LSI, for generating an operation clock for the bus arbiter by dividing an operation clock for a bus master bus interconnecting the bus master device and the LSI into the same number as that of the bus master devices controlled by the bus arbiter, and a second serial/parallel converting means, provided on the side of the bus master device, for converting the request signal received from the bus master device through said bus master device arbitration interface means into a serial signal so to send the serial signal to the LSI, as well as converting the acknowledge signal of the serial signal received from the LSI into a parallel signal for every bus master device so to pass the parallel signal to the bus master device through said bus master device arbitration interface means, wherein serial signal transferring means sampling in parallel-to-serial signal conversion being performed at the rising edge of the operation clock for the bus master device and sampling in serial-to-parallel signal restoration being performed at the falling edge of the operation clock for the bus master device, in said first and second serial/parallel converting means.

5. A bus arbitration interface for connecting an LSI and a given device, comprising:

a serial signal transferring unit, connecting a DMA device to an LSI with a DMA controller built therein, for exchanging a request signal sent from the DMA device to the DMA controller and an acknowledge signal sent from the DMA controller to the DMA device as serial signals;

a DMA arbitration bus interface, that is an outside interface of the LSI, provided with signal I/O pins; and a DMA device arbitration interface that is an outside interface of the DMA device; and wherein said serial signal transferring unit comprising a first serial/parallel converting unit, mounted within the LSI, for converting the acknowledge signal supplied from the DMA controller into a serial signal so to supply the serial signal to the DMA device through said DMA arbitration bus interface, as well as converting the request signal of the serial signal received through said DMA arbitration bus interface into a parallel signal for every DMA device so to pass the parallel signal to the DMA controller, a clock dividing unit, mounted within the LSI, for generating an operation clock for the DMA controller, and a second serial/parallel converting unit, provided on the side of the DMA device, for converting the request signal received from the DMA device through said DMA device arbitration interface into a serial signal so to send the serial signal to the LSI, as well as converting the acknowledge signal of the serial signal received from the LSI into a parallel signal for every DMA device so to pass the parallel signal to the DMA device through said DMA device arbitration interface, wherein said serial signal transferring unit sampling in parallel-to-serial signal conversion being performed at the rising edge of the operation clock and sampling in serial-to-parallel signal restoration being performed at the falling edge of the operation clock, in said first and second serial/parallel converting units.

6. A bus arbitration interface for connecting an LSI and a given device, comprising:

a serial signal transferring unit, connecting a DMA device to an LSI with a DMA controller built therein, for exchanging a request signal sent from the DMA device to the DMA controller and an acknowledge signal sent from the DMA controller to the DMA device as serial signals;

a DMA arbitration bus interface, that is an outside interface of the LSI, provided with signal I/O pins; and a DMA device arbitration interface that is an outside interface of the DMA device; and wherein said serial signal transferring unit comprising a first serial/parallel converting unit, mounted within the LSI, for converting the acknowledge signal supplied from the DMA controller into a serial signal so to supply the serial signal to the DMA device through said DMA arbitration bus interface, as well as converting the request signal of the serial signal received through said DMA arbitration bus interface into a parallel signal for every DMA device so to pass the parallel signal to the DMA controller, a clock dividing unit, mounted within the LSI, for generating an operation clock for the DMA controller by dividing an operation clock for a DMA bus which interconnects the DMA device and the LSI into the same number as that of the DMA devices controlled by the DMA controller, and a second serial/parallel converting unit, provided on the side of the DMA device, for converting the request signal received from the DMA device through said DMA device arbitration interface into a serial signal so to send the serial signal to the LSI, as well as converting the acknowledge signal of the serial signal received from the LSI into a parallel signal for every DMA device so to pass the parallel signal to the DMA device through said DMA device arbitration interface, wherein serial signal transferring unit sampling in parallel-to-serial signal conversion being performed at the rising edge of the operation clock for the DMA device and sampling in serial-to-parallel signal restoration being performed at the falling edge of the operation clock for the DMA device, in said first and second serial/parallel converting units.

7. A bus arbitration interface for connecting an LSI to a given device, comprising:

a serial signal transferring unit, connecting a bus master device to an LSI having a bus master arbitration function, for exchanging a request signal sent from the bus master device to a bus arbiter built in the LSI and an acknowledge signal sent from the bus arbiter to the bus master device as serial signals;

a bus master arbitration bus interface, that is an outside interface of the LSI, provided with signal I/O pins; and a bus master device arbitration interface that is an outside interface of the bus master device; and wherein said serial signal transferring unit comprising a first serial/parallel converting unit, mounted within the LSI, for converting the acknowledge signal supplied from the bus arbiter into a serial signal so to supply the serial signal to the bus master device through said bus master arbitration bus interface, as well as converting the request signal of the serial signal received through said bus master arbitration bus interface into a parallel signal for every bus master device so to pass the parallel signal to the bus arbiter, a clock dividing unit, mounted within the LSI, for generating an operation clock for the bus arbiter, and a second serial/parallel converting unit, provided on the side of the bus master device, for converting the request signal received from the bus master device through said bus master device arbitration interface into a serial signal so to send the serial signal to the LSI, as well as converting the acknowledge signal of the serial signal received from the LSI into a parallel signal for every bus master device so to pass the parallel signal to the bus master device through said bus master device arbitration interface, wherein serial signal transferring unit sampling in parallel-to-serial signal conversion being performed at the rising edge of the operation clock and sampling in serial-to-parallel signal restoration being performed at the falling edge of the operation clock, in said first and second serial/parallel converting units.

8. A bus arbitration interface for connecting an LSI to a given device, comprising:

a serial signal transferring unit, connecting a bus master device to an LSI having a bus master arbitration function, for exchanging a request signal sent from the bus master device to a bus arbiter built in the LSI and an acknowledge signal sent from the bus arbiter to the bus master device as serial signals;

a bus master arbitration bus interface, that is an outside interface of the LSI, provided with signal I/O pins; and a bus master device arbitration interface that is an outside interface of the bus master device; and wherein said serial signal transferring unit comprising a first serial/parallel converting unit, mounted within the LSI, for converting the acknowledge signal supplied from the bus arbiter into a serial signal so to supply the serial signal to the bus master device through said bus master arbitration bus interface, as well as converting the request signal of the serial signal received through said bus master arbitration bus interface into a parallel signal for every bus master device so to pass the parallel signal to the bus arbiter, a clock dividing unit, mounted within the LSI, for generating an operation clock for the bus arbiter by dividing an operation clock for a bus master bus interconnecting the bus master device and the LSI into the same number as that of the bus master devices controlled by the bus arbiter, and a second serial/parallel converting unit, provided on the side of the bus master device, for converting the request signal received from the bus master device through said bus master device arbitration interface into a serial signal so to send the serial signal to the LSI, as well as converting the acknowledge signal of the serial signal received from the LSI into a parallel signal for every bus master device so to pass the parallel signal to the bus master device through said bus master device arbitration interface, wherein serial signal transferring unit sampling in parallel-to-serial signal conversion being performed at the rising edge of the operation clock for the bus master device and sampling in serial-to-parallel signal restoration being performed at the falling edge of the operation clock for the bus master device, in said first and second serial/parallel converting units.

9. A method for connecting an LSI and a DMA device comprising:

converting a first parallel acknowledge signal supplied from a DMA controller into a first serial acknowledge signal and supplying the first serial acknowledge signal to the DMA device through a DMA arbitration bus interface;

converting a first serial request signal received through the DMA arbitration bus interface into a first parallel request signal for every DMA device and passing the first parallel request signal to the DMA controller;

converting a second parallel request signal received from the DMA device through the DMA arbitration interface into a second serial request signal and sending the second serial request signal to the LSI; and converting a second serial acknowledge signal received from the LSI into a second parallel acknowledge signal for every DMA device and passing the second parallel acknowledge signal to the DMA device through the DMA device arbitration interface; and wherein sampling in parallel-to-serial signal conversion is performed at the rising edge of an operation clock and sampling in serial-to-parallel signal restoration is performed at the falling edge of an operation clock.

10. A method for connecting an LSI and a DMA device comprising:

converting a first parallel acknowledge signal supplied from a DMA controller into a first serial acknowledge signal and supplying the first serial acknowledge signal to the DMA device through a DMA arbitration bus interface;

converting a first serial request signal received through the DMA arbitration bus interface into a first parallel request signal for every DMA device and passing the first parallel request signal to the DMA controller;

dividing an operation clock for a DMA bus which interconnects the DMA device and the LSI into the same number as that of the DMA devices controlled by the DMA controller;

converting a second parallel request signal received from the DMA device through the DMA arbitration interface into a second serial request signal and sending the second serial request signal to the LSI; and converting a second serial acknowledge signal received from the LSI into a second parallel acknowledge signal for every DMA device and passing the second parallel acknowledge signal to the DMA device through the DMA device arbitration interface; and wherein sampling in parallel-to-serial signal conversion is performed at the rising edge of the operation clock for the DMA device and sampling in serial-to-parallel signal restoration is performed at the falling edge of the operation clock for the DMA device.

* * * * *